United States Patent [19]
Heyn et al.

[11] Patent Number: 5,620,273
[45] Date of Patent: Apr. 15, 1997

[54] SECTIONAL BAR SYSTEM

[75] Inventors: Klaus Heyn, Zell/Mosel; Jochen Koehn, Wittlich, both of Germany

[73] Assignee: Zeller Plastik, GmbH, Zell/Monsel, Germany

[21] Appl. No.: 507,445

[22] PCT Filed: Mar. 11, 1994

[86] PCT No.: PCT/EP94/00759

§ 371 Date: Nov. 16, 1995

§ 102(e) Date: Nov. 16, 1995

[87] PCT Pub. No.: WO94/20762

PCT Pub. Date: Sep. 15, 1994

[30] Foreign Application Priority Data

Mar. 12, 1993 [DE] Germany ............ 43 07 920.2

[51] Int. Cl.⁶ .................................. F16B 7/04
[52] U.S. Cl. ............... 403/170; 403/171; 403/176; 403/217; 52/655.1; 52/731.7
[58] Field of Search ............... 403/170, 171, 403/176, 217, 218; 52/646, 648.1, 655.1, 656.9, 657, 731.7

[56] References Cited

U.S. PATENT DOCUMENTS

| | | | |
|---|---|---|---|
| 4,129,975 | 12/1978 | Gabriel | 403/217 X |
| 4,348,129 | 9/1982 | Conforti | 403/218 |
| 4,674,256 | 6/1987 | Chailleux | 403/171 X |
| 4,835,932 | 6/1989 | Leete, II et al. | |
| 5,326,337 | 7/1994 | Pardella | 403/170 X |

FOREIGN PATENT DOCUMENTS

| | | | |
|---|---|---|---|
| 1484004 | 12/1968 | Germany . | |
| 8011543 | 6/1980 | Germany . | |
| 2933712 | 3/1981 | Germany | 403/217 |
| 3115913 | 11/1982 | Germany . | |
| 3324553 | 1/1985 | Germany . | |
| 3437930 | 6/1986 | Germany . | |
| 3727045 | 11/1988 | Germany . | |
| 3826874 | 3/1989 | Germany . | |
| 9100699 | 6/1991 | Germany . | |
| 914720 | 1/1963 | United Kingdom . | |
| 1071700 | 6/1967 | United Kingdom . | |

OTHER PUBLICATIONS

International Search Report listing refs.

Primary Examiner—Blair Johnson
Assistant Examiner—Bruce A. Lev
Attorney, Agent, or Firm—Kane, Dalsimer, Sullivan, Kurucz, Levy, Eisele and Richard

[57] ABSTRACT

This invention provides a sectional bar system consisting of X-section bars and connecting elements preferably made up of pyramids. The advantages of the invention are a large variety of possible designs and high stability of the sectional bar system as well as easy and inexpensive production of the connecting elements.

29 Claims, 11 Drawing Sheets

SECTIONAL BAR SYSTEM

This invention relates to a system of sectional bars capable of being assembled.

Such systems can be assembled to form spatial elements. Building elements consisting of sectional elements and connecting elements made essentially of metal or wood, such as displays, show cases, shelves or spatial partitions, are known.

DE-A-14 84 004 discloses a section bar with a connecting element. The section bar can have an X-shaped cross-section and tapers off at its ends to form a pointed tip. Furthermore, connecting elements are disclosed exhibiting recesses, each of which can hold one end of a X-section bar.

The object of this invention is to provide a sectional bar system made of plastics exhibiting high stability and making a particularly wide variety of applications available. In particular, the elements are to be fixed together to form re-usable transport containers.

The solution of this invention starts from the principle idea of using X-section bars with tapered ends. The ends of the sectional bars engage with connecting elements having several surfaces, which are preferably shaped as a cuboid, but also other bodies having several surfaces such as octahedrons are possible. The individual connecting elements can be formed of several individual parts which can be attached to one another by means of adhesives, by welding or by mechanical engagement, whereby the individual parts are preferably pyramid shaped.

In a first embodiment of this invention, X-section bars are used that taper off at their ends to form pointed tips. The ends of the section bars are connected by connecting elements with several surfaces. The connecting elements consist of several parts and can be assembled.

In a second embodiment of this invention, X-section bars are provided that taper off at their ends to form pointed tips. The X-section bars are connected by means of connecting elements. First joining elements present in the X-section bars and second joining elements present in the connecting elements are snap elements. The first joining element comprises a nose tapering off in the shape of a pyramid and a retention support, whereas the second joining element comprises a recess complementary to the nose, into which the nose can be pressed, and a spring-loaded retaining part, into which the retention support can snap.

The advantages of this invention are characterized by low weight and high stability of the structures formed by the system. The frames and transport containers can be easily assembled and dismounted using machines.

The X-section bars and the connecting elements are preferably extruded or injection-molded from thermoplastics, preferably polypropylene, preferably from recyclates such as recycled plastics.

In the following, the invention is explained in more detail based on the drawings.

FIG. 2b shows a front view of the X-section bar of FIG. 2a;

FIG. 2c is a cross-section along the line 2c—2c of FIG. 2a;

Figure 1:
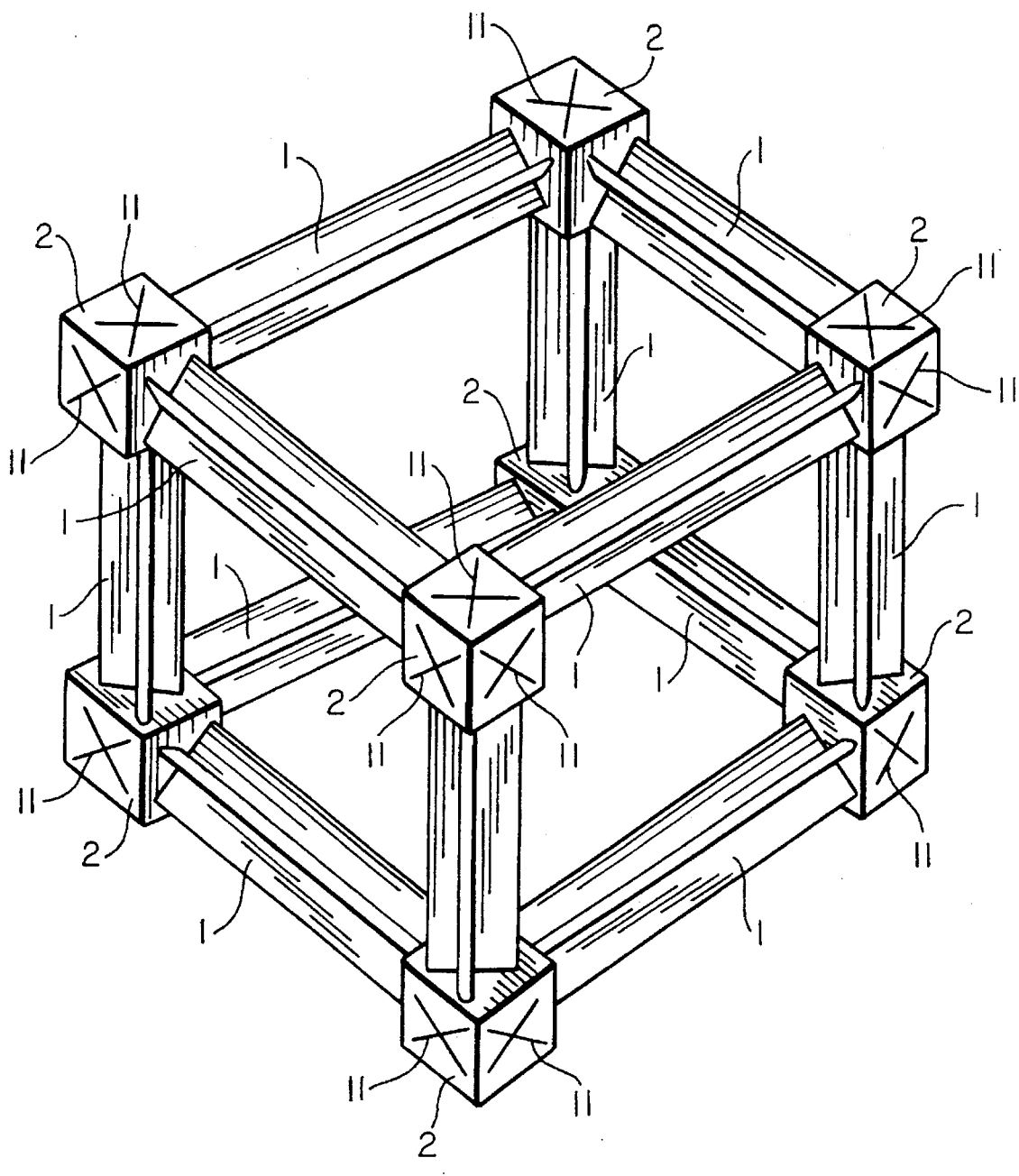
FIG. 1 shows a perspective view of a structure formed by the X-sectional bar system according to this invention.

FIG. 1 shows a schematic structure of a basic element of the X-sectional bar system according to this invention formed by means of twelve X-section bars 1 and eight connecting elements 2. In this example, the connecting elements are cube shaped and have recesses 11 on all six surfaces, the shape and size of which match the ends of the X-section bars. X-section bars 1 can be inserted into the recesses 11, here drawn as crossing slots and are held inside (cf. FIG. 5) the connecting elements. 2. This basic element can be added to on all sides so that structures as high and as wide as desired can be built depending on the static properties of the base material.

Figure 2B:
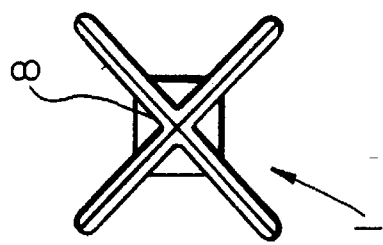
Figure 2D:
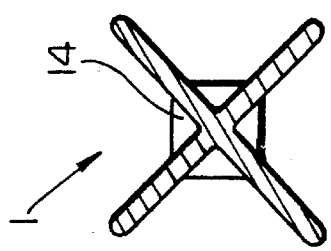
FIG. 2d is a cross-section along the line 2d—13 2d of FIG. 2c.
Figure 2A:
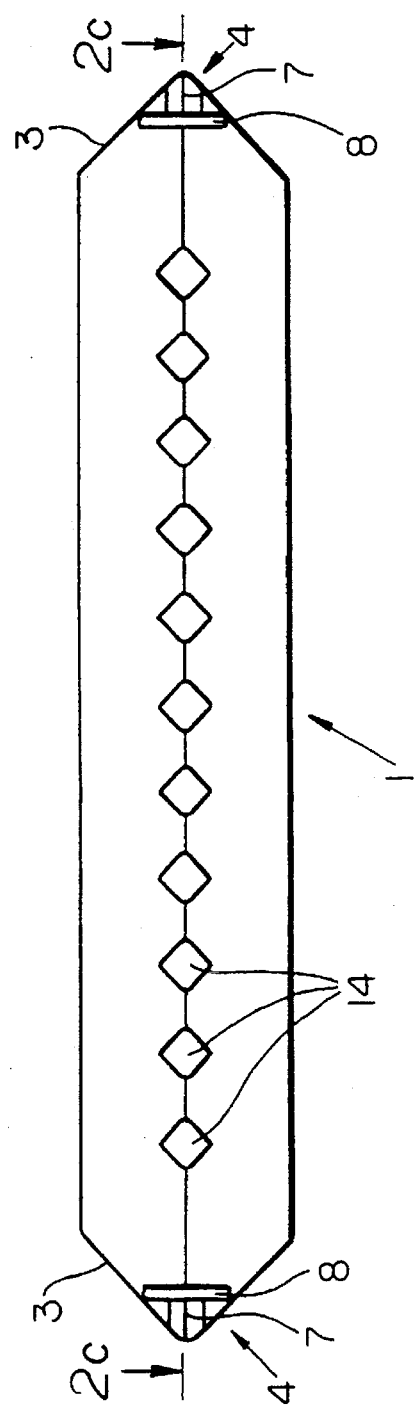
FIG. 2a shows a side view of an embodiment of an X-section bar according to this invention.

FIG. 2a shows a side view of an X-section bar 1 according to this invention. The bar 1 has a tapered tip at its ends 3. The tip preferably is at an angle of 45° with the longitudinal edges of the X-section bar 1. The ends 3 each have a joining element 4 for the connecting element 2 consisting of a nose 7 tapered in a pyramid shape and a retention support 8 (retention flange), whereby the edges of the nose 7 and the edges of the retention support 8 are within the alignment of the ends 3. Several projections 14 are located in longitudinal direction of the X-section bar 1 which serve as assembling means (preferably with locking means) for other section bars 1, which can be arranged between two X-section bars 1 perpendicular to the longitudinal direction of the X-section bar 1. The ends 3 of the X-section bars 1 can be inserted between the projections 14. The projections 14 are located axially symmetrical between the section surfaces, which are preferably at an angle of 90° so that a variable assembly of X-section bars 1 becomes possible.

FIG. 2b shows a front view of the X-section bar 1 of FIG. 2a with a retention support 8 filling a space between the section surfaces.

Figure 2C:
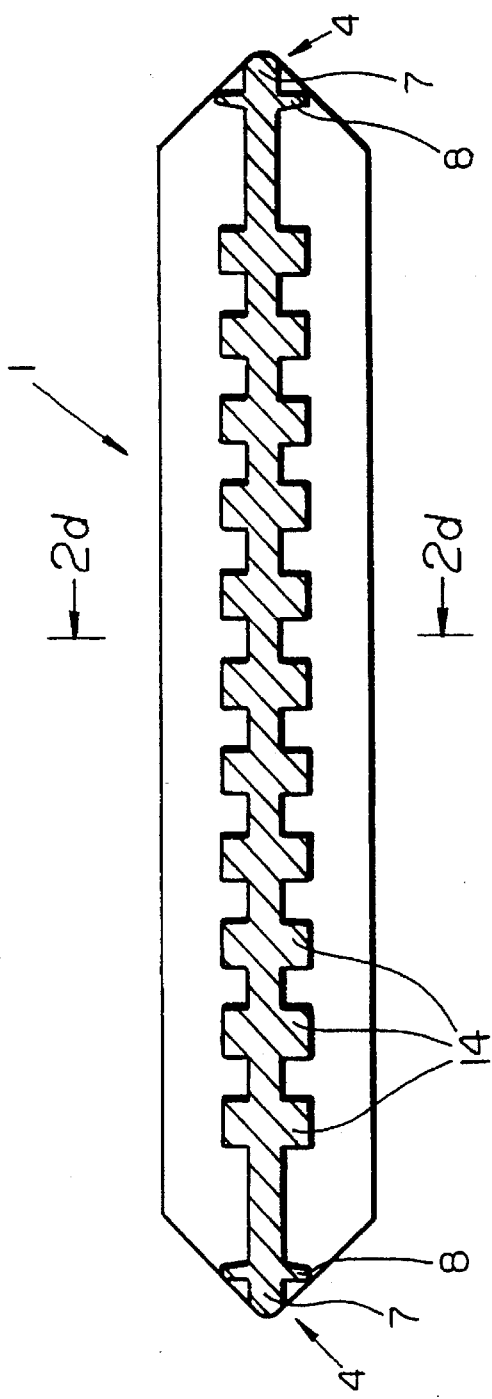
Figure 2F:
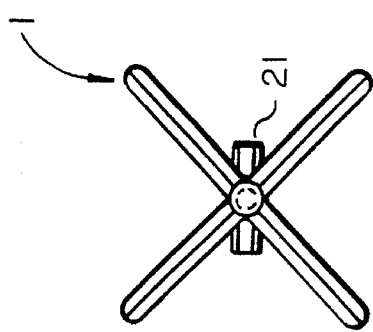
FIG. 2f shows a front view of the X-section bar of FIG. 2e.
Figure 2H:
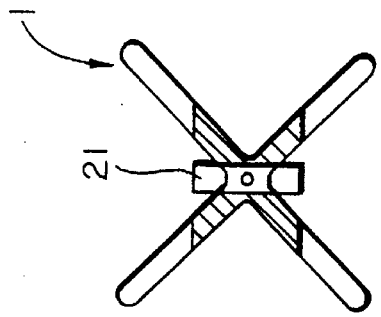
FIG. 2h is a cross-section along the line 2h—2h in FIG. 2g.
Figure 2E:
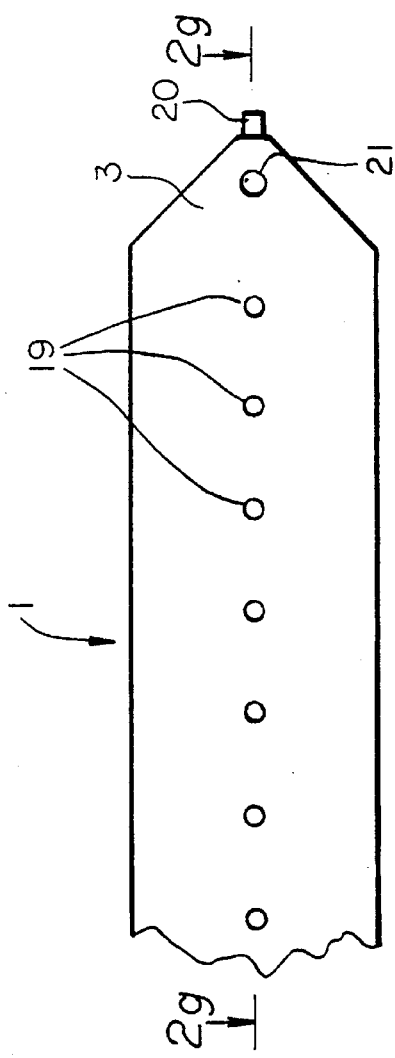
FIG. 2e shows a side view of another embodiment of an X-section bar according to this invention.
Figure 2G:
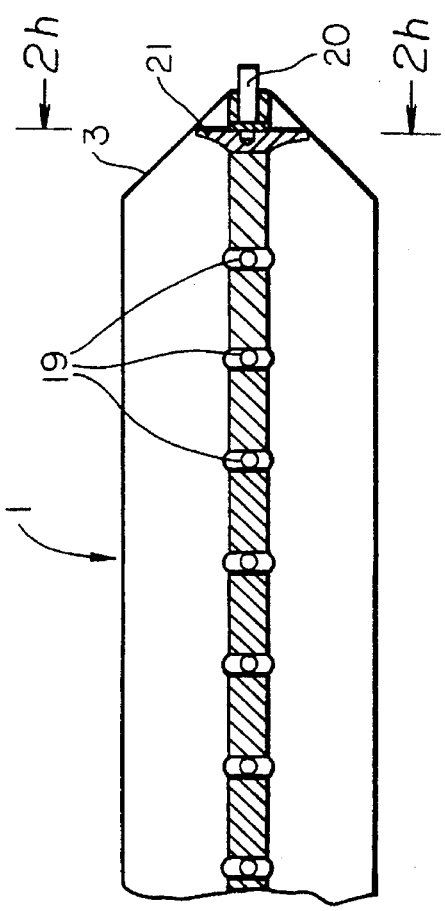
FIG. 2g is a cross-section along the line 2g—2g in FIG. 2e.

FIG. 2c is a cross-section along the line 2c—2c in FIG. 2a. The areas without hatching show semi-surfaces of the X-section bar 1 slanting downwards.

FIG. 2d is a cross-section along the line 2d—2d in FIG. 2c. The X-section of the bar I is cut and a projection 14 is underneath the drawing plane.

FIGS. 2e to 2h show the X-section bar 1 as an extruded part. The following differences occur in comparison to FIGS. 2a to 2d. The projection 14 is replaced by a hole 19 (bore) located therebetween. The nose 7 is replaced by a socket pin 20, and the pointed retention support 8 is replaced by the mounted retention support 21. The tapered ends 3 as well as the holes 19 are produced by subsequent mechanical machining.

Figure 3:
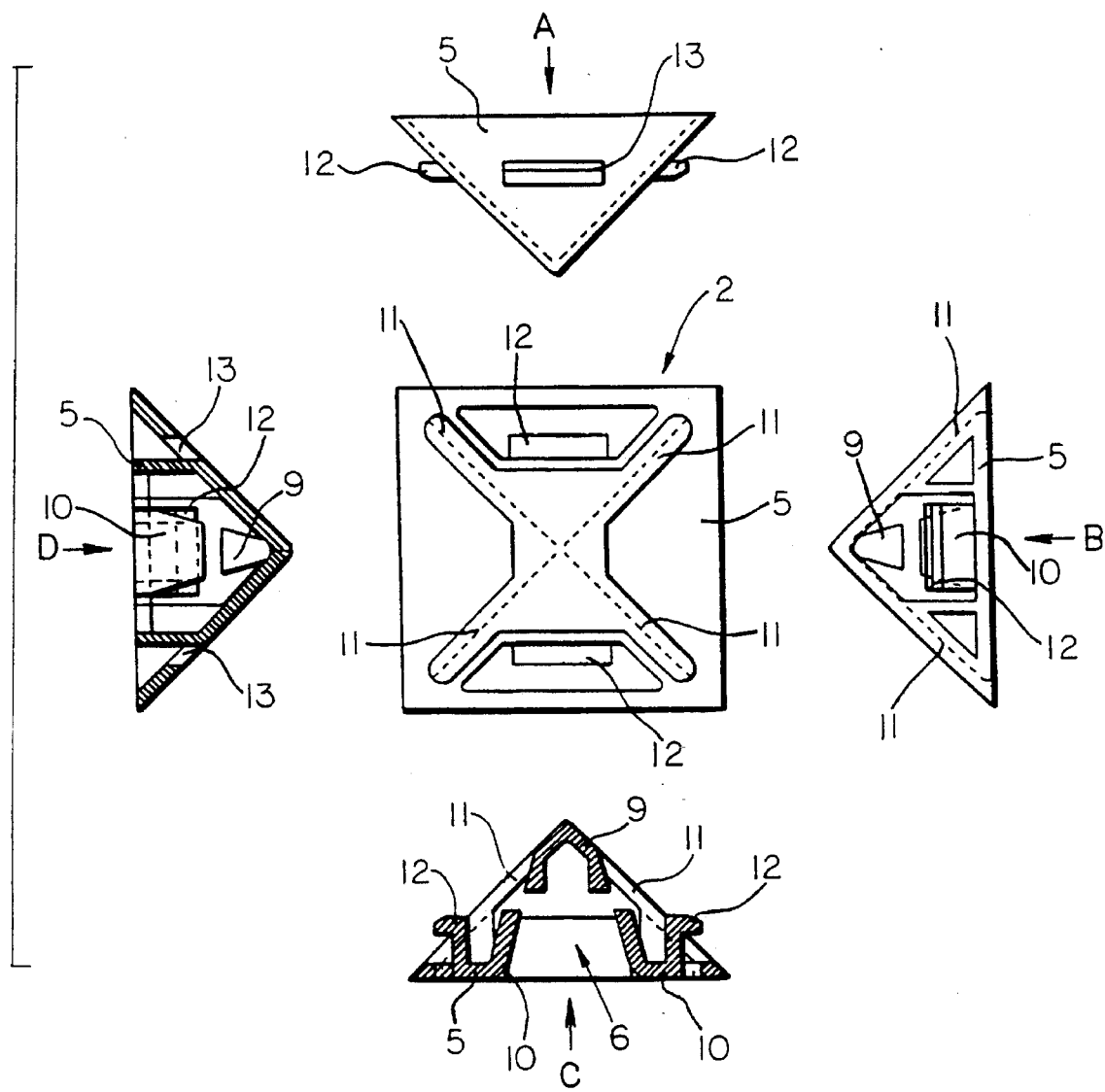
FIG. 3 shows a side view of an embodiment of the connecting element according to this invention and an exploded view of four pyramid elements according to this invention.

FIG. 3 shows a preferred embodiment of a connecting element 2 as a cube produced by assembly of six preferably identical pyramids 5 in a side view (area of a pyramid 5). There are slots 11 into which an X-section bar 1 can be inserted. The pyramids 5 forming the cube surfaces A to D perpendicular to the drawing plane are shown in the exploded view. Pyramids 5 of surfaces A and B are shown in a side view and those of surfaces C and D cut through the center parallel to the drawing plane. The pyramids 5 have projections 12 or complementary slots 13 on every two opposite surfaces which can be engaged with corresponding slots 13 or projections 12 of another pyramid 5 and hold six pyramids 5 together as a cube 2. Besides, the pyramids 5 have second joining elements 6 each consisting of a recess 9 for the tip 7 of the X-section bar 1 and a retaining part 10 for the retention support 8 of the X-section bar 1, into which the X-section bar 1 can be inserted through the base surface of the pyramid 5.

Figure 4:
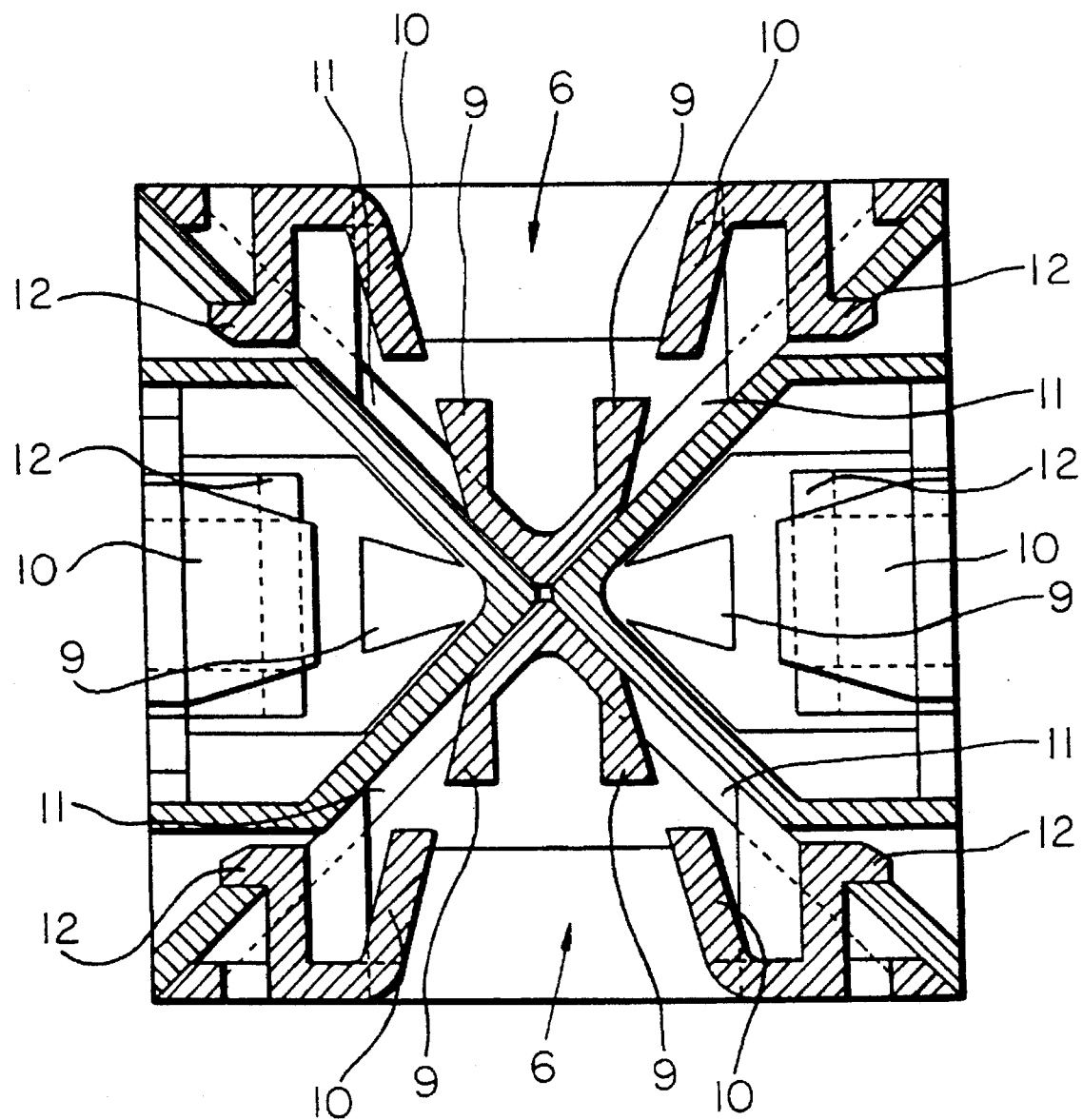
FIG. 4 is a cross-section through the center of the connecting element of FIG. 3.

FIG. 4 shows an enlarged cross-section through the center of the cube 2 of FIG. 3 parallel to the drawing plane, i.e. the cut pyramids forming surfaces A to D.

Figure 5:
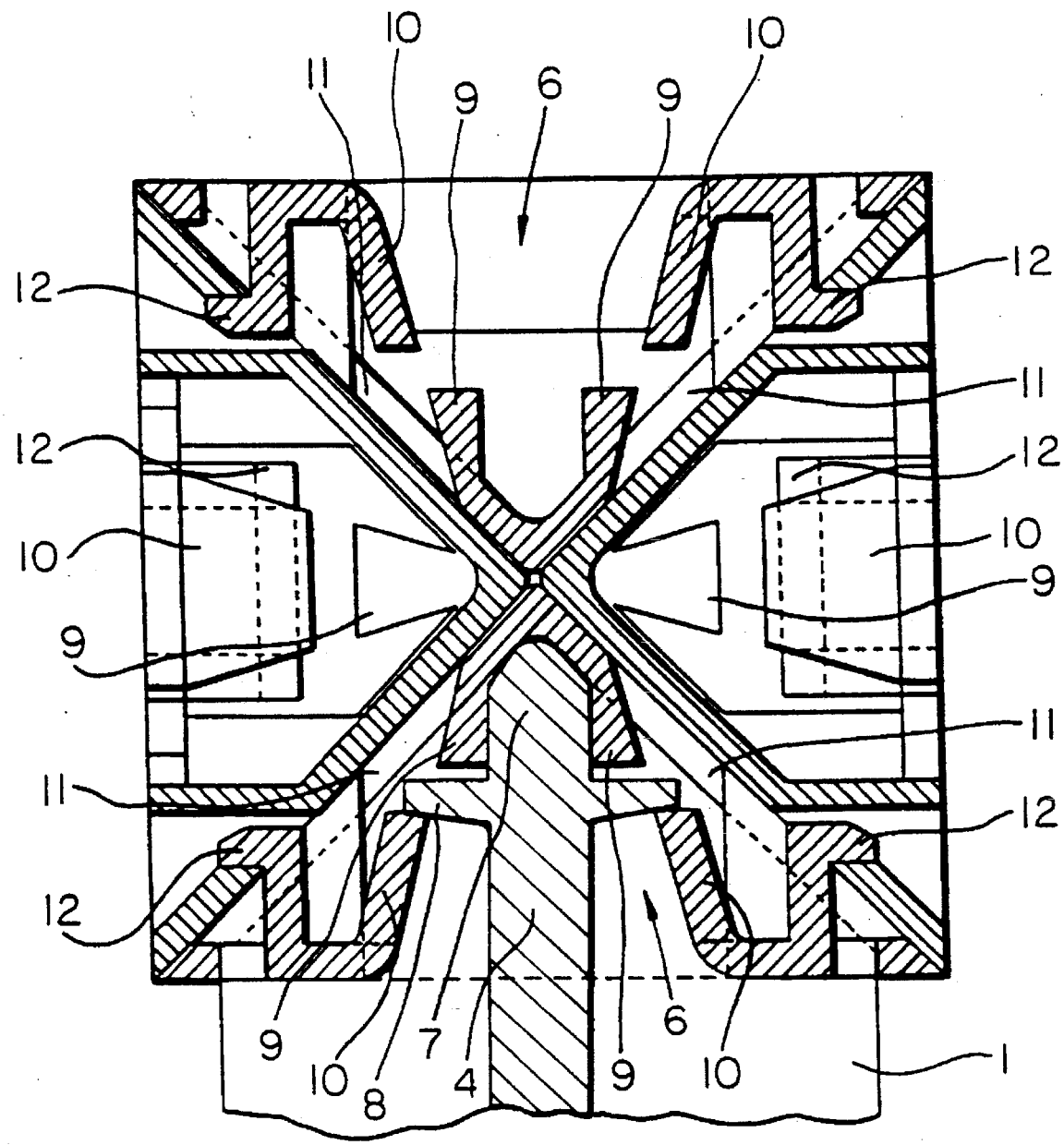
FIG. 5 is a cross-section according to FIG. 4 with the interlocked end of an X-section bar.

FIG. 5 shows the cross-section according to FIG. 4 with a first joining element 4 of the X-section bar 1. The first joining element 4 is connected to the second joining element 6 of a pyramid 5 by a snap connection. When the first joining element 4 is put in, the retention support 8 pushes the spring-loaded retaining part 10 aside and locks in behind the retaining part 10, which springs back. The path of the retention support 8 is limited by the recess and/or the stopper 9. This way the connection of the X-section bar 1 and the connecting element 2 is very stable. The slots 11, which run inwards in a pyramid shape, stabilize the X-section bar 1 in longitudinal direction.

Structures consisting of the X-sectional bar system according to this invention can easily be dismounted. The retaining part 10 merely has to be pushed open by means of a suitable tool and the X-section to be pulled out of the pyramid 5.

Figure 6:
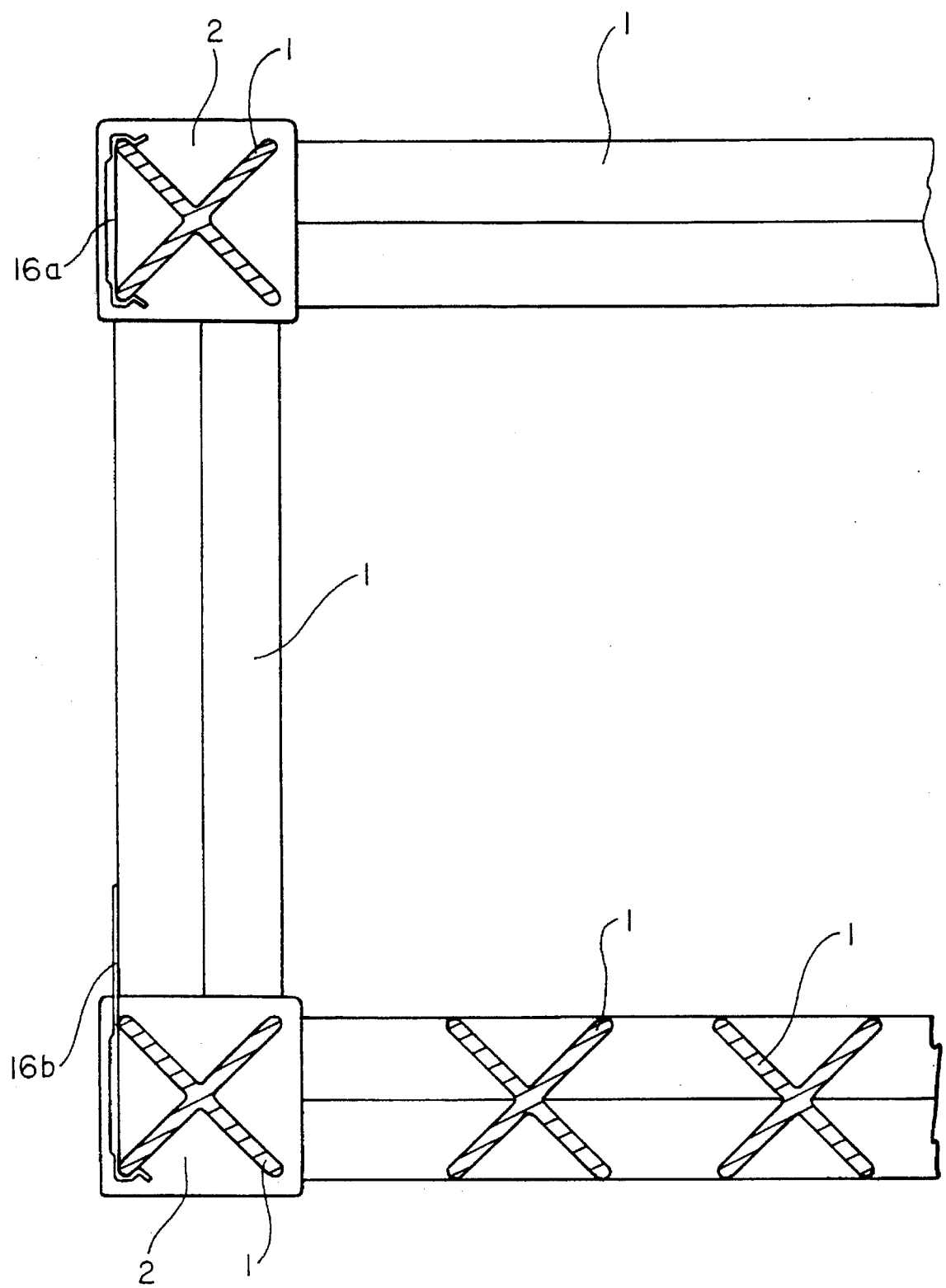
FIGS. 6, 7a, 7b and 8 show embodiments of adapters on the X-section bars according to this invention.

FIG. 6 shows two adapters 16a, 16b according to this invention which can be clamped onto the X-section bar 1. The adapter 16a can serve e.g. as a price tag for goods in a display consisting of the X-sectional bar system according to this invention. The adapter 16b (depicted only in parts) can e.g. be a sheathing.

Figure 7A:
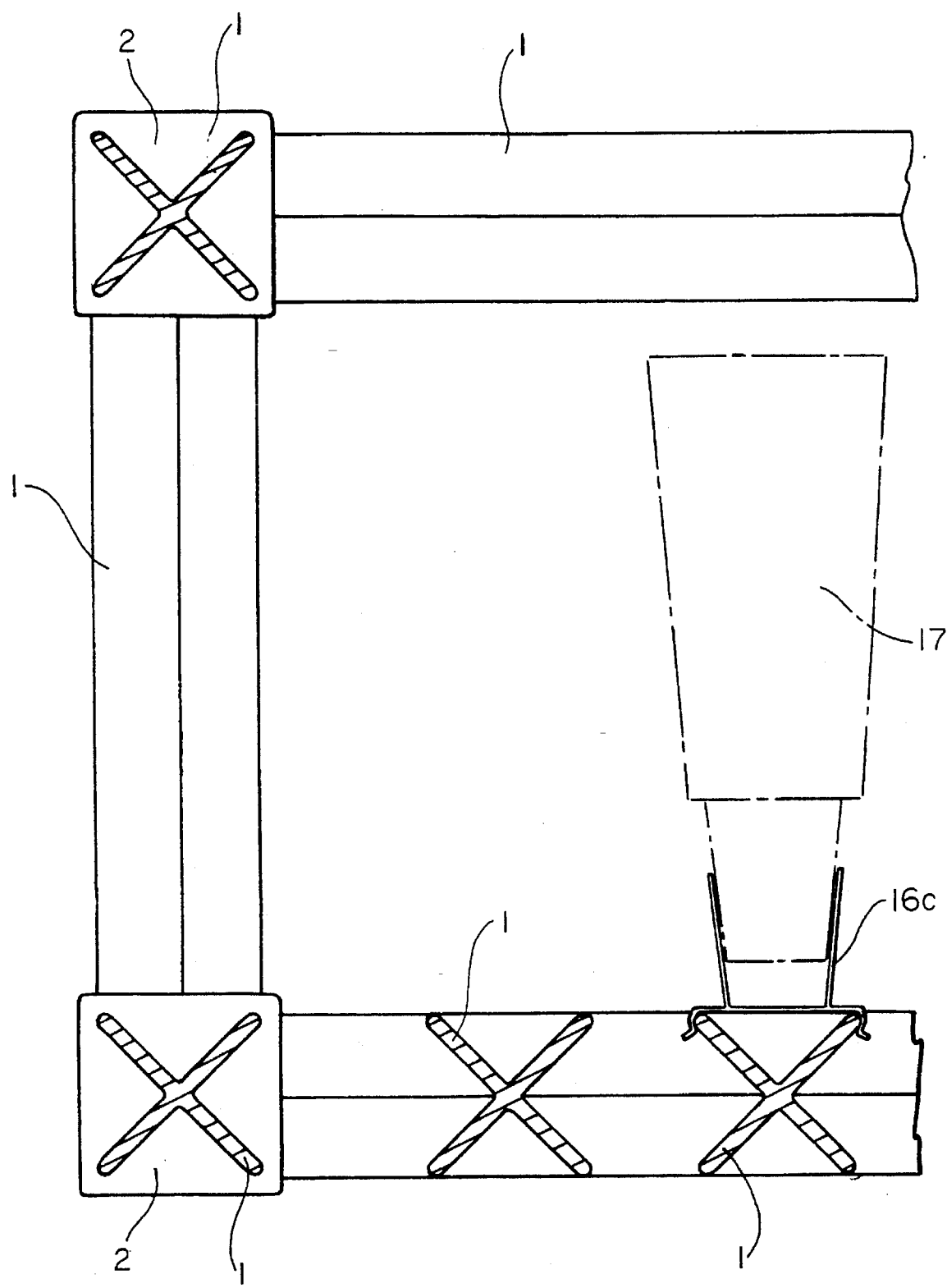

FIG. 7a shows an adapter 16c as a mounting for an article or an exhibition piece 17. The article is held in the mounting standing upright. The adapter 16c can be part of an exhibition piece 17 or an independent part 16c.

Figure 7B:
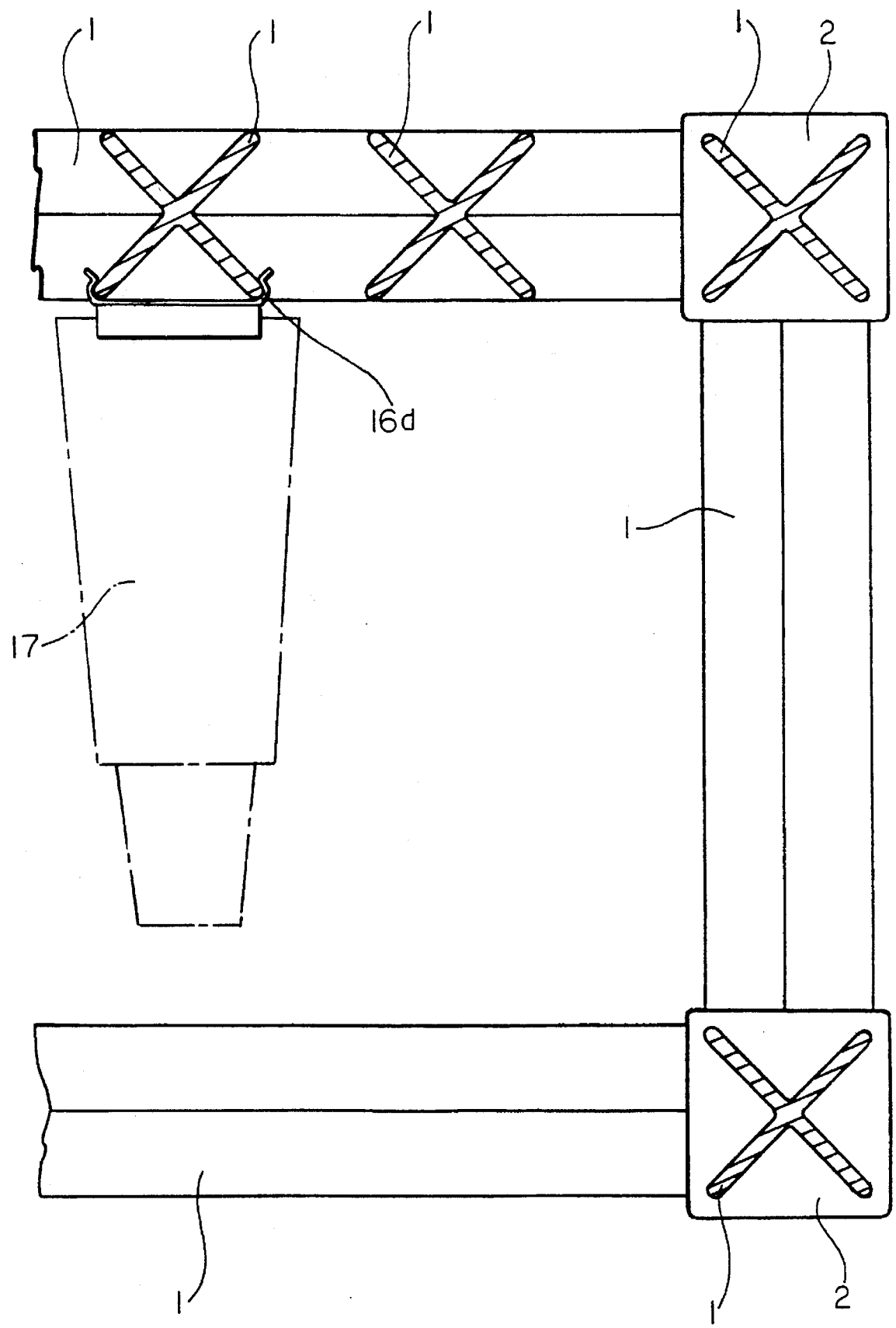

FIG. 7b shows an adapter 16d as a hanging mounting for the article or an exhibition piece 17. The adapter 16d can be part of an exhibition piece 17 or an independent part 16d.

Figure 8:
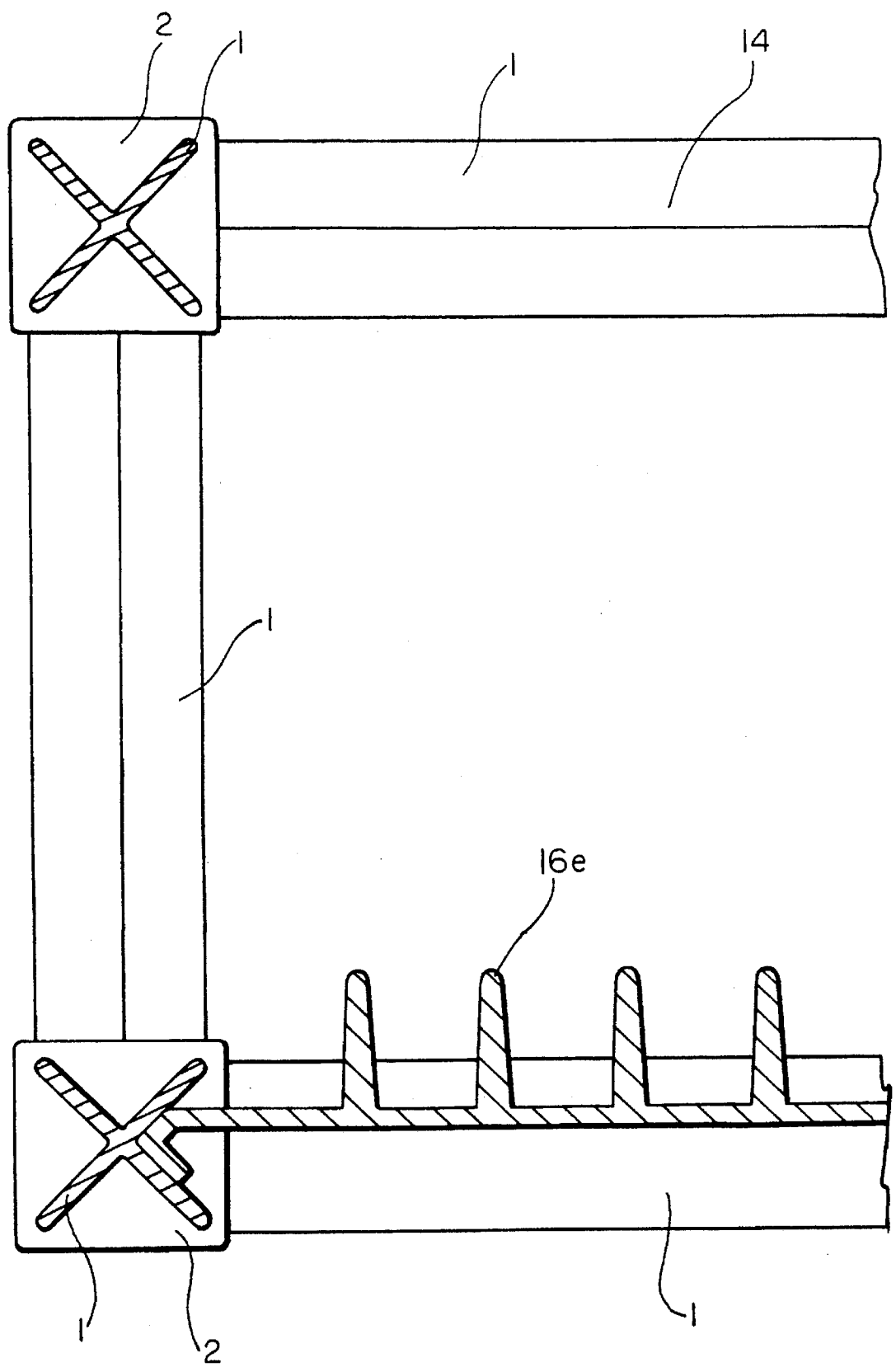

The adapter 16e partially shown in FIG. 8 is clamped between two parallel X-section bars 1. It can have the shape of a panel and serves as a mounting for goods or exhibition pieces.

The X-sectional bar system according to this invention can be used for the assembly of e.g. exhibition or sales shelves or show cases as well as for spatial partitions.

Figure 9:
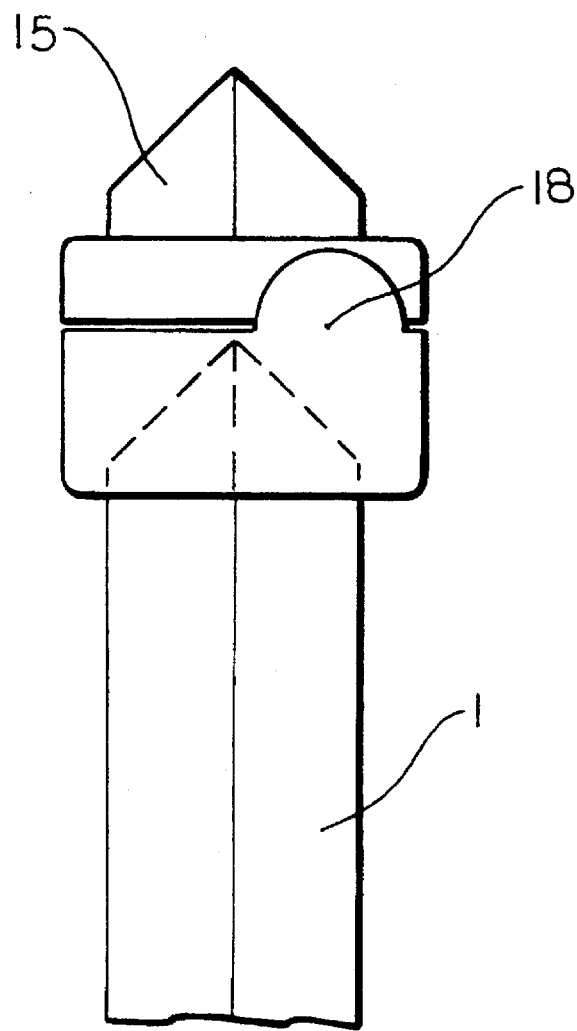
FIG. 9 shows an embodiment of an X-section joint according to this invention.

A preferred application of the X-sectional bar system of this invention is the assembly of transport containers. Such transport containers, made of X-section bars can be equipped with joint pieces 15 (FIG. 9). for the X-section bars 1. A frame that can be open or closed by means of a panel which is held on the vertical X-section bars 1 by means of two joint pieces 15 can be flipped upwards around the joint axes 18.

The joint pieces 15 can also be located between upper and lower frame such that an empty transport container can be folded down.

This enables the return of empty transport containers requiring a minimum of space.

In a preferred embodiment, the parts of the X-sectional bar system are produced from polypropylene reinforced with glass-fibers.

We claim:

1. Sectional bar system comprising
   a) bars (1), the surfaces of which form X-profiles over their whole lengths, and
   b) connecting elements (2), each of which comprise several assembled parts for the bars (1), wherein
   c) the bars (1), which have tapered ends (3), comprise first joining elements (4) for the connection with the connecting elements (2), and
   d) the connecting elements (2) comprise recesses (11), which each can receive one tapered end (3) of a bar (1), and second joining elements (6) for the connection with the first joining elements (4) of the bars (1), and
   e) the connecting elements (2) are cubes each formed preferably by six pyramids (5) with four surfaces.

2. Sectional bar system according to claim 1, characterized in that the pyramids (5) comprise pyramid-shaped crossing slots (11) for guiding the bars (1).

3. Sectional bar system according to claim 1, characterized in that the pyramids (5) can be engaged with one another by means of projections (12) and/or complementary slots (13).

4. Sectional bar system according to claim 1, characterized in that the bars (1) comprise assembling means (14, 19) successively lined up in longitudinal direction into which further bars (1) may be fixed.

5. Sectional bar system according to claim 4 characterized in that the assembling means are rectangular projections (14) located in the middle of the bars (1).

6. Sectional bar system according to claim 4, characterized in that the assembling means are holes (19) located in the middle of the bars (1).

7. Sectional bar system according to claim 1, characterized by adapters (16a to 16e) which can be mounted onto the X-section bars (1).

8. Sectional bar system according to claim 7, characterized in that the adapters (16a to 16e) are carriers for products, price tags, sheathings, mountings, panels or transport handles.

9. Sectional bar system according to claim 1, characterized by joints (15), which movably connect the bars (1).

10. Sectional bar system according to claim 1, characterized in that it is made from polypropylene, preferably from recycled plastics.

11. Use of the sectional bar system according to claim 1 as a re-usable transport container.

12. Use according to claim 11, characterized in that the transport container can be folded or unfolded by swivelling the bars (1).

13. Use of the sectional bar system according to claim 1 as a shelf for exhibition or sale purposes.

14. Use of the sectional bar system according to claim 1 at the same time as transport container and display.

15. Sectional bar system comprising
   a) bars (1), the surfaces of which form X-profiles over their whole lengths, and
   b) connecting elements (2) for the bars (1), wherein
   c) the bars (1), which have tapered ends (3), comprise first joining elements (4) for the connection with the connecting elements (2),
   d) the connecting elements (2) comprise recesses (11), which each can receive one tapered end (3) of a bar (1), and second joining elements (6) for the connection with the first joining elements (4) of the bars (1), e) the first joining element (4) and second joining element (6) are in the form of snap elements, f) the first joining element (4) comprises a nose (7) tapered in a pyramid shape and a retention support (8), and g) the second joining element (6) comprises a recess (9) complementary to the nose (7), into which the nose (7) can be fitted, and a spring-loaded retaining part (10), into which the retention support (8) can snap.

16. Sectional bar system according to claim 15, characterized in that the connecting elements (2) are cubes each formed preferably by six pyramids (5) with four surfaces.

17. Sectional bar system according to claim 16, characterized in that the pyramids (5) comprise pyramid-shaped crossing slots (11) for guiding the bars (1).

18. Sectional bar system according to claim 16, characterized in that the pyramids (5) can be engaged with one another by means of projections (12) and/or complementary slots (13).

19. Sectional bar system according to claim 15, characterized in that the bars (1) comprise assembling means (14, 19) successively lined up in longitudinal direction into which further bars (1) may be fixed.

20. Sectional bar system according to claim 19, characterized in that the assembling means are rectangular projections (14) located in the middle of the bars (1).

21. Sectional bar system according to claim 19, characterized in that the assembling means are holes (19) located in the middle of the bars (1).

22. Sectional bar system according to claim 15, characterized by adapters (16*a* to 16*e*) which can be mounted onto the bars (1).

23. Sectional bar system according to claim 22, characterized in that the adapters (16*a* to 16*e*) are carriers for products, price tags, sheathings, mountings, panels or transport handles.

24. Sectional bar system according to claim 15, characterized by joints (15), which movably connect the bars (1).

25. Sectional bar system according to claim 15, characterized in that it is made from polypropylene, preferably from recycled plastics.

26. Use of the sectional bar system according to claim 15 as a re-usable transport container.

27. Use according to claim 26, characterized in that the transport container can be folded or unfolded by swivelling the bars (1).

28. Use of the sectional bar system according to claim 15 as a shelf for exhibition or sale purposes.

29. Use of the sectional bar system according to claim 15 at the same time as transport container and display.

* * * * *